United States Patent Office 2,829,167
Patented Apr. 1, 1958

2,829,167

HIGH TEMPERATURE CATALYTIC CRACKING OF METHYL ISOPROPENYL KETONE DIMER TO METHYL ISOPROPENYL KETONE

Fred J. Lowes, Midland, Mich., assignor to The Dow Chemical Company, Midland, Mich., a corporation of Delaware No Drawing. Application April 4, 1956
Serial No. 575,971

6 Claims. (Cl. 260—593)

This invention relates to the high temperature cracking of methyl isopropenyl ketone dimer to yield methyl isopropenyl ketone monomer. More particularly, it relates to a high-temperature catalytic cracking of methyl isopropenyl ketone dimer in the presence of a dehydrogenation catalyst so that methyl isopropenyl ketone monomer can be prepared from its dimer.

In the preparation and storage of methyl isopropenyl ketone, substantial proportions of methyl isopropenyl ketone dimer are formed which now have no value. Methyl isopropenyl ketone monomer, on the other hand, is of considerable value in the preparation of polymeric products. Until the present time, no satisfactory method of recovering the monomeric methyl isopropenyl ketone from its dimer has been known. Heating up to a temperature at which material distils, results merely in the distillation of unchanged dimer. At still higher temperatures, distillation and/or decomposition and cracking to give uneconomic amounts of monomer occur, depending upon how high above its boiling point the dimer is heated.

In accordance with this invention, it has now been discovered that methyl isopropenyl ketone dimer can be cracked to give good yields of monomer by heating the dimer at elevated temperatures in the presence of a catalytic amount of a dehydrogenation catalyst, such as activated $Al_2O_3$, Ni-Ca-$PO_4$ catalyst, $MoO_3$ on $Al_2O_3$, $Fe_2O_3$-containing catalyst and the like.

A temperature ranging from about 300° to 600° C. is advantageously used, and preferably about 500° C. Lower temperatures than about 300° C. give uneconomic yields, while higher temperatures than 600° C. result in excessive decomposition of the dimer.

The amount of catalyst used in proportion to methyl isopropenyl ketone dimer is not critical. Trace amounts are operable. In commercial practice, however, a heated Vicor tube furnace 1 inch in diameter and 30 inches long, filled with catalyst to a depth of 24 inches and heated within the range of about 300° to about 600° C. is advantageously used, and through it is passed the methyl isopropenyl ketone dimer. From the catalysate is recovered methyl isopropenyl ketone, as by condensing and fractionally distilling the condensed products of reaction. Any unconverted dimer can be recycled.

The following examples represent preferred embodiments of this invention.

Example 1

Methyl isopropenyl ketone dimer, 183 grams, was fed through a 1 inch Vicor tube furnace containing 200 ccs. Ca-Ni-$PO_4$ catalyst heated to about 475° to 525° C., over a period of 1 hour and 15 minutes. A recovery of 151 grams was attained, which analyzed 85 percent methyl isopropenyl ketone monomer, the remainder being mostly dimer. The Ca-Ni-$PO_4$ catalyst used was a Dow type catalyst having the following specifications:

| | Percent |
|---|---|
| Ni | 4.3–5.5 |
| Ca | 27–32.0 |
| $PO_4$ | 49.0–60.5 |
| Graphite and $Cr_2O_3$ | 1.0–8.0 |

Example 2

The procedure of Example 1 was repeated with a feed of 85 grams methyl isopropenyl ketone dimer over a time period of 50 minutes, other conditions being the same as in Example 1. A recovery of 75 grams of 80 percent methyl isopropenyl ketone was attained.

Example 3

The procedure of Example 1 was repeated with a feed of 100 grams methyl isopropenyl ketone dimer and an equal volume of a ferric oxide-containing catalyst at a reaction temperature of about 475° to 550° C. over a time period of 20 minutes. A recovery of 80 grams of 21 percent methyl isopropenyl ketone was attained. Unconverted dimer was collected for reprocessing.

Example 4

The procedure of Example 1 was repeated with a feed of 142 grams methyl isopropenyl dimer, the same type and amount of catalyst as in Example 1, and a temperature of 550° to 600° C. over a time period of one hour and 30 minutes. A recovery of 52 percent methyl isopropenyl ketone product was attained. Unconverted dimer was collected for reprocessing.

Example 5

The procedure of Example 1 was repeated with a feed of 100 grams methyl isopropenyl ketone dimer, the same type and amount of catalyst as in Example 1 and a temperature of about 300° to 325° C. over a time period of 15 minutes. A recovery of 37 percent methyl isopropenyl ketone product was attained. Unconverted dimer was collected for reprocessing.

What is claimed is:

1. A process for cracking methyl isopropenyl ketone dimer to methyl isopropenyl ketone monomer which comprises heating said dimer within the temperature range of about 300° to 600° C. in the presence of a catalytic amount of a dehydrogenation catalyst and recovering methyl isopropenyl ketone from the catalysate.

2. A process as in claim 1 in which the reaction products are condensed and fractionally distilled to yield methyl isopropenyl ketone.

3. A process as in claim 1 in which a Ni-Ca-$PO_4$ dehydrogenation catalyst is used.

4. A process as in claim 1 in which an activated alumina catalyst is used.

5. A process as in claim 1 in which a ferric oxide-containing catalyst is used.

6. A process as in claim 1 in which a reaction temperature range of about 475° to 525° C. and a Ni-Ca-$PO_4$ catalyst are used.

References Cited in the file of this patent

UNITED STATES PATENTS 2,577,445    Bortnick _____ Dec. 4, 1951